(12) United States Patent
Giallorenzi et al.

(10) Patent No.: US 8,107,982 B2
(45) Date of Patent: Jan. 31, 2012

(54) METHOD AND APPARATUS FOR FDD AND TDD TERMINAL ENTRY INTO A WIRELESS COMMUNICATION NETWORK

(75) Inventors: Thomas R. Giallorenzi, Herriman, UT (US); Christopher Jensen, Morgan, UT (US); Jason Woosuk Lee, Salt Lake City, UT (US); James Dyal, South Jordan, UT (US); Larry S. Thomson, Bountiful, UT (US)

(73) Assignee: L-3 Communications, Corp., New York, NY (US)

( * ) Notice: Subject to any disclaimer, the term of this patent is extended or adjusted under 35 U.S.C. 154(b) by 0 days.

(21) Appl. No.: 13/104,791

(22) Filed: May 10, 2011

(65) Prior Publication Data

US 2011/0211501 A1  Sep. 1, 2011

Related U.S. Application Data

(62) Division of application No. 11/986,578, filed on Nov. 21, 2007, now Pat. No. 7,962,161.

(51) Int. Cl.
*G06F 17/30* (2006.01)
(52) U.S. Cl. ........................................ 455/466
(58) Field of Classification Search ........... 455/59, 455/456.1, 466; 370/294, 252, 280, 281, 370/329
See application file for complete search history.

(56) References Cited

U.S. PATENT DOCUMENTS

| | | | |
|---|---|---|---|
| 5,475,677 A | 12/1995 | Arnold et al. | |
| 5,715,525 A | 2/1998 | Tarusawa et al. | |
| 6,226,274 B1 | 5/2001 | Reese et al. | |
| 6,535,748 B1 | 3/2003 | Vuorio et al. | |
| 6,549,567 B1 | 4/2003 | Fullerton | |
| 6,611,507 B1 | 8/2003 | Hottinen et al. | |
| 7,006,534 B1 | 2/2006 | Nemoto | |
| 7,573,837 B1 * | 8/2009 | Mangal et al. | 370/260 |
| 7,804,792 B2 | 9/2010 | Choi et al. | |
| 2005/0163146 A1 * | 7/2005 | Ota et al. | 370/432 |
| 2007/0147424 A1 * | 6/2007 | Anigstein | 370/469 |
| 2007/0223632 A1 | 9/2007 | Boskovic et al. | |
| 2008/0151790 A1 | 6/2008 | Lee et al. | |
| 2008/0247391 A1 | 10/2008 | Choi et al. | |
| 2010/0157820 A1 | 6/2010 | Cheng et al. | |
| 2010/0157850 A1 | 6/2010 | Horn et al. | |
| 2010/0290375 A1 | 11/2010 | Chin et al. | |
| 2011/0119703 A1 * | 5/2011 | Schlack et al. | 725/34 |

FOREIGN PATENT DOCUMENTS

WO  WO 2005/060182  12/2004

OTHER PUBLICATIONS

U.S. Appl. No. 11/986,578, filed Nov. 21, 2007, Giallorenzi.

* cited by examiner

*Primary Examiner* — Diane Mizrahi
(74) *Attorney, Agent, or Firm* — Kirton & McConkie; N. Kenneth Burraston (57) ABSTRACT

Entry of a terminal into a wireless communications network is facilitated for terminals which may operate in either frequency-division duplex or time-division duplex mode. Join request messages transmitted by the terminals include a duplex capability indicator defining a carrier frequency which can be used to response to the terminals.

16 Claims, 6 Drawing Sheets

METHOD AND APPARATUS FOR FDD AND TDD TERMINAL ENTRY INTO A WIRELESS COMMUNICATION NETWORK

This application is a divisional of U.S. patent application Ser. No. 11/986,578, filed Nov. 21, 2007, which is herein incorporated by reference.

FIELD OF THE INVENTION

The present invention relates generally to wireless communications systems.

BACKGROUND

Wireless communications seems ubiquitous, with wireless internet, cellular telephones, pagers, and other wireless devices in common use. Most wireless communications networks use a specific system architecture optimized for the particular application being provided. For example, cellular telephone systems have many design aspects optimized to provide low power consumption and enable mobility for the handset. Cellular telephone systems typically operate in frequency-division duplex mode and use relatively low data rates. In contrast, cordless telephone systems, because of the short range operation and frequent battery re-charging, typically use higher burst data rates and operate in time-division duplex mode.

With increased integration levels and price reductions for electronics, many wireless devices are now being developed that can operate within different networks. One area of research and development is so-called "software radios" which are an attempt to provide highly flexible radios that can operate using a multitude of different waveforms and communications parameters. Software radio technology is a building block technology for multi-network operation, as the software radio can change operating parameters (e.g., modulation format or symbol rate) to match the network it wishes to communicate with.

As communications devices become capable of operating in different network types, the problem of discovering and entering into communication with a network becomes more complex. Entering a network is typically straightforward for a device designed for single-network operation, as the device is generally preprogrammed to use signaling parameters compatible with the network. In contrast, devices designed for multi-network operation are faced with the challenge of determining appropriate signaling parameters to allow communication with the network.

While differences in data rates and modulation formats can be handled by establishing fall-back data rates and modulation modes to provide compatibility, other system design aspects prove more difficult. For example, a time-division duplex (TDD) system uses a common frequency for transmission in both directions (e.g. from a base station to a handset and vice versa). In contrast, a frequency-division duplex (FDD) system uses different frequencies in each direction (e.g., a forward link carrier frequency for transmission from the base station to the handset and a return link carrier frequency for transmission from the handset to the base station). Accordingly, providing communication between a device using one duplex mode and a network using the other duplex mode is not normally possible.

Heretofore, most systems have operated in only one or the other type of duplex mode, and switching between modes is not generally done. While some terminals capable of switching modes are known, these terminals usually know a priori which type of network they are attempting to enter. When a network can be operating in either mode, the mode of operation of the network is unknown, or terminals of incompatible types wish to enter a network (e.g., a TDD terminal into an FDD network, or vice versa), several difficulties are presented.

SUMMARY OF THE INVENTION

It has been recognized that it would be advantageous to develop a technique to facilitate the entry of a terminal into a wireless communication network, where the terminal may be operating in either a frequency-division duplex or time-division duplex mode of operation.

One embodiment of the present invention is a method for facilitating the entry of a terminal into a wireless communication network. The method includes establishing a defined carrier frequency for transmission of join request messages. Terminals can transmit a join request message to be received by the communications network using the defined carrier frequency. The join request message includes information defining the duplex capability of the terminal. The communication network can therefore transmit a response message to the terminal, using a carrier frequency defined by the duplex capability information included in the join request message. The response message can include information to enable entry of the terminal into the communications network.

In accordance with another embodiment of the present invention is a wireless communications system enabling entry of terminals operable in a frequency-division duplex or a time-division duplex mode. The system can include at least one control terminal having capabilities for transmission using a first carrier frequency, transmission using a second carrier frequency, and reception using at least the first carrier frequency. Discovery messages can be transmitted between the control terminal and a joining terminal, such as join request messages sent from the joining terminal to the control terminal and response messages sent from the control terminal to the joining terminal. Join request messages include a field defining the duplex capability of a joining terminal which allows the control terminal to use a selected one of either the first carrier frequency or the second carrier frequency to transmit response messages to the joining terminal. The selection of first or second carrier frequency is based on the duplex capability of the joining terminal.

In accordance with another embodiment of the present invention is a terminal for use within a communications network. The terminal includes a message formatter to format a join request message having a duplex capability indicator. The duplex capability indicator can be associated with a defined receive carrier frequency. A transmitter in the terminal can transmit the join request message using a defined transmit carrier frequency. A receiver in the terminal can receive a response message using the defined receive carrier frequency. A decoder in the terminal can extract communications network parameters from the response message to enable entry of the terminal into the communications network.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Because time-division duplex (TDD) systems use a single carrier frequency to exchange messages and frequency-division duplex (FDD) systems use dual carrier frequencies to exchange messages, the two types of systems are generally incompatible. Entry of a terminal into a communication network involves two-way communication between the terminal and the communication network, which is difficult to accomplish when the terminal and the communication network are not transmitting to each other on frequencies at which the other is listening.

These challenges can be mitigated by a terminal seeking to join a communication network transmitting a join request message to the communication network using a defined carrier frequency. The use of the defined carrier frequency helps to ensure that the join request message is transmitted at a carrier frequency that is received by the network. The join request message can include information that defines how the communications network can transmit a response back to the terminal. For example, the join request message can help to remove ambiguity as to whether the terminal is a TDD terminal (expecting a response back on the same carrier frequency on which the terminal transmitted) or an FDD terminal (expecting a response back on a different carrier frequency). Accordingly, the communication network can use the included information to determine how to communicate back to the terminal.

Figure 1:
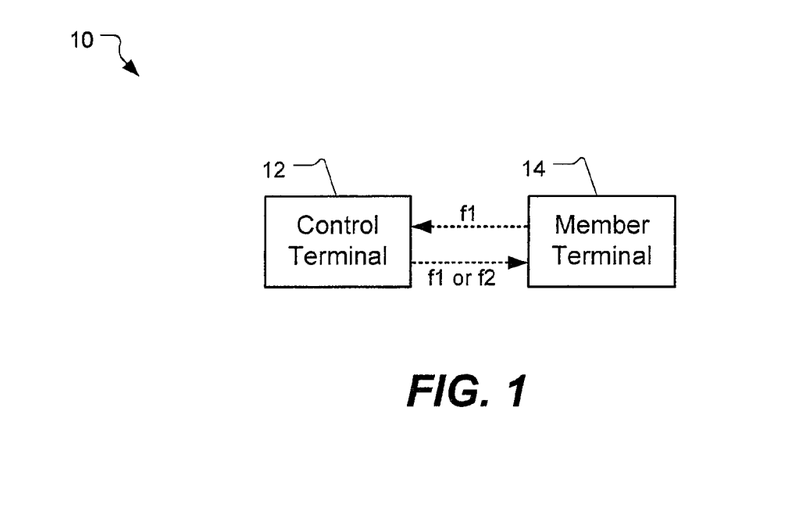
FIG. 1 is a block diagram of a communication system in accordance with an embodiment of the present invention.

FIG. 1 illustrates a block diagram of a wireless communication system in accordance with an embodiment of the present invention. The wireless communication system, shown generally at 10, may operate in either a time-division duplex or frequency-division duplex mode of operation. The wireless communication system includes at least one control terminal 12 and can include a variable and changing number of member terminals 14 (e.g., none, one, two, three, tens, or hundreds of member terminals).

The control terminal 12 is capable of transmitting on either of a first carrier frequency (f1) or a second carrier frequency (f2) to the member terminals. Accordingly, the control terminal can include a transmitter which can be tuned to f1, f2, and possibly other carrier frequencies.

The control terminal 12 is also capable of receiving the first carrier frequency from member terminals. The control terminal may also be capable of receiving on the second carrier frequency from member terminals. In other words, the control terminal includes a receiver which can be tuned to at least f1, and may also be able to be tuned to other carrier frequencies, such as f2. Communications between the control terminal and the member terminal may occur at radio frequencies f1 and/or f2, shown by dotted lines, for example via a wireless radio channel.

Figure 2:
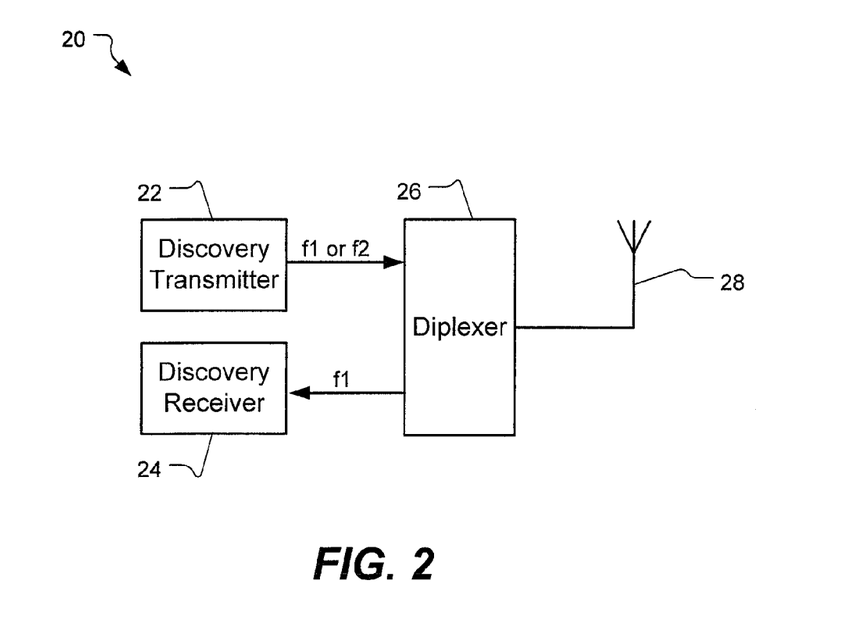
FIG. 2 is a block diagram of a control terminal in accordance with an embodiment of the present invention useable in the communication system of FIG. 1.

For example, as shown in FIG. 2, a control terminal 20 may include a discovery transmitter 22 capable of transmitting on both f1 and f2. The control terminal may also include a discovery receiver 24 capable of receiving on at least f1. The transmitter and receiver may be coupled to an antenna 28 via a diplexer 26. The diplexer may be switchable, for example, to allow any, some, or all of: transmission on f1 and reception on f2, transmission on f2 and reception on f1, transmission and reception on f1, or transmission and reception on f2.

Figure 3:
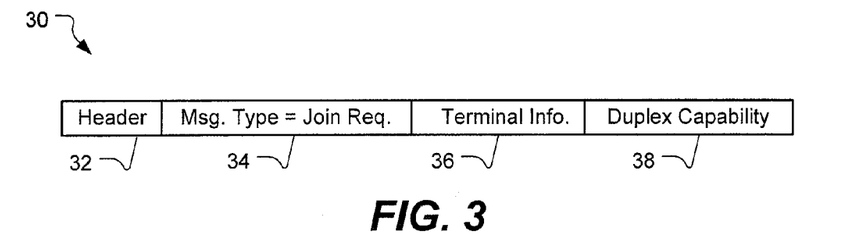
FIG. 3 is an illustration of a join request message of a discovery protocol in accordance with an embodiment of the present invention.

Returning to FIG. 1, entry of member terminals 12 into the wireless communication system 10 can operate according to a defined discovery protocol using join request messages and response messages. Join request messages are transmitted from the member terminal seeking to enter into the network (e.g., 14) to the control terminal 12 on the first carrier frequency (f1). For example, FIG. 3 illustrates an exemplary join request message that may be transmitted on the first carrier frequency. The join request message may include, for example, a header field 32, a message type field 34, a terminal information field 36, and duplex capability information field 38. For example, the header field may be used to aid in acquisition or synchronization of the join request message (e.g., a preamble, a sync word, or both). The message type field may indicate that the message is a join request message. The terminal information may include information identifying the particular terminal (e.g., name, identification, location, navigational data, address, authorization, topology information, etc.).

The duplex capability field 38 includes information defining the duplex capability of the joining terminal. For example, the duplex capability field may provide one bit of information indicating TDD or FDD operation. As another example, the duplex capability field may provide a receive carrier frequency indicator field defining the receive carrier frequency for which the terminal is able to receive.

The duplex capability field 38 provides information that helps to enable the control terminal 12 to communicate to the terminal 14. The duplex capability field is associated with a receive carrier frequency, allowing the control terminal to know what carrier frequency to transmit on. This association may be direct, for example, when the duplex capability field includes a terminal receive carrier frequency field. As another example, the association may be indirect, for example, when the duplex capability field indicates TDD or FDD operation and defined receive carrier frequencies are defined for TDD and FDD operation (e.g., TDD uses f1 in both directions, FDD uses f1 from member terminals to control terminal and f2 from control terminal to member terminals). Of course, many ways of encoding equivalent information into the duplex capability field may be used as well that provides the same result. In other words, the duplex capability field provides, among potentially other purposes, the function of informing the control terminal what carrier frequency on which to respond to the terminal that has sent the join request.

Figure 4:
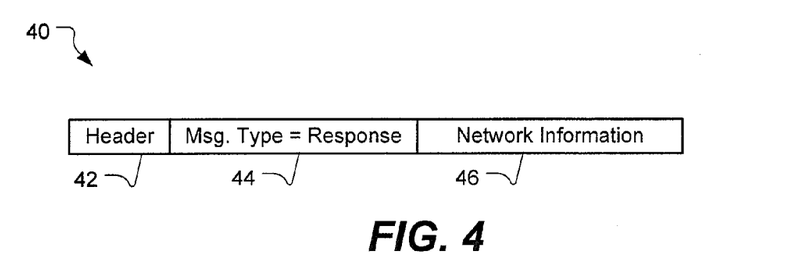
FIG. 4 is an illustration of a response message of a discovery protocol in accordance with an embodiment of the present invention.

Upon receiving the join request message, the control terminal 12 can send a response message to the terminal 14, switching the transmitter 22 to transmit using either f1 or f2, determined as above. FIG. 4 illustrates an exemplary response message. The response message may include various fields, including for example, a header field 42 (e.g., as described above), a message type field 44 (e.g., indicating in this case a "response" message), and a network information field 46. The header field and message type field may use similar definitions and encoding as for the join request message, or may be different to account for differing needs and capabilities of receivers and transmitters implemented within the control terminal and the member terminals.

The network information field 46 includes information to enable entry of the terminal 14 (FIG. 1) into the communications network formed by the communication system 10. For example, the network information field may include traffic channel parameters (e.g., traffic channel frequencies, traffic channel data rates, traffic channel modulation modes, traffic channel synchronization parameters, identification, location, navigation, topology, or similar types of information). It will be appreciated that the join request message 30 and response message 40 can also include additional fields (e.g., check sums, authentication data, etc.).

Figure 5:
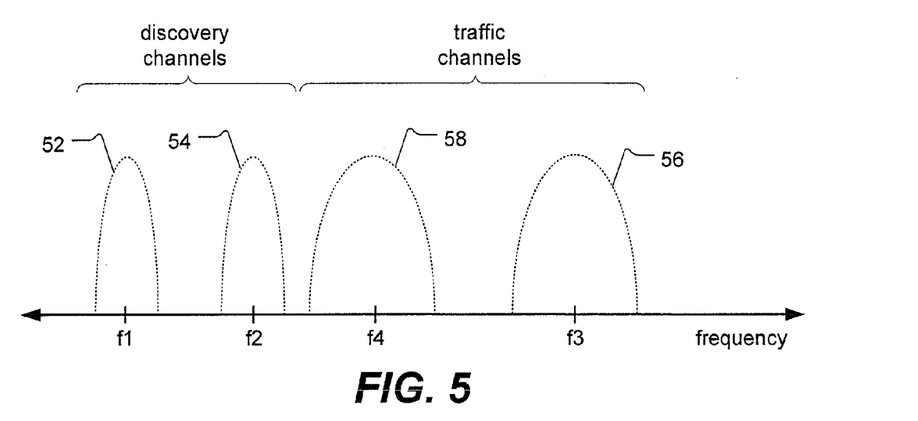
FIG. 5 is an illustration of a frequency spectrum for a frequency-division duplex system in accordance with an embodiment of the present invention.

Operation of the communication system 10 (FIG. 1) may include exchanging data traffic between the control terminal 12 and member terminals 14, exchanging data traffic directly between member terminals, or both. Data exchange may use the same channel frequencies, f1 and/or f2, as the discovery messages. Alternatively, different channel frequencies may be used for data traffic than are used for discovery messages (join request and response). For example, FIG. 5 illustrates the frequency spectrum for a FDD system having discovery channels 52, 54 using a first carrier frequency (f1) and a second carrier frequency (f2) for exchange of discovery messages. A separate set of traffic channels 56, 58 use a third carrier frequency (f3) and a fourth carrier frequency (f4). The traffic channels may, for example, operate at higher data rates that the discovery channels, and thus occupy wider bandwidth than the discovery channels.

Transmissions from the member terminals to the control terminal may use return channels 52, 56, for example, transmitting join request messages on the return discovery channel 52, and once entry into the wireless communication network is complete, transmitting data traffic messages on the return traffic channel 56.

Figure 6:
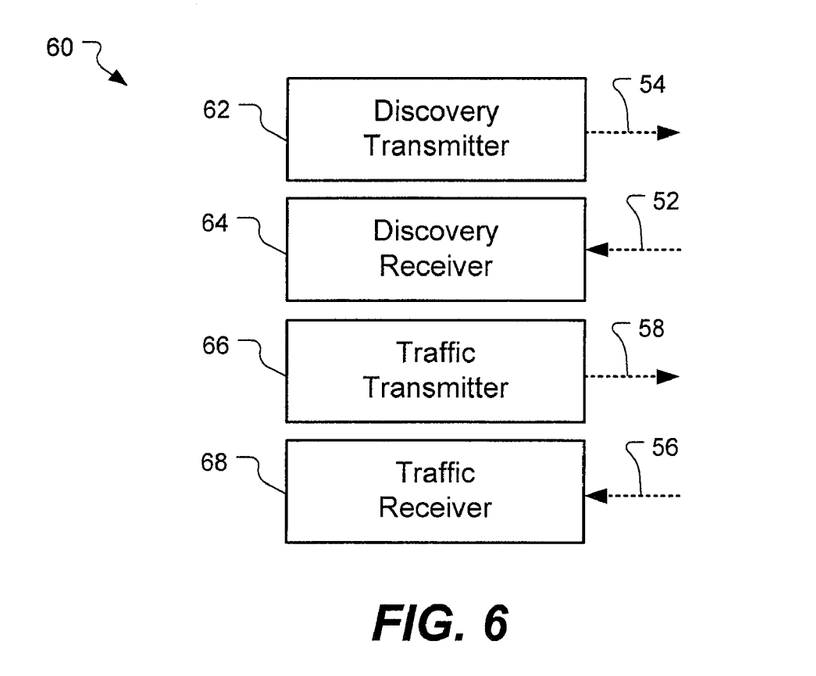
FIG. 6 is a block diagram of a control terminal in accordance with another embodiment of the present invention.

Transmissions from the control terminal to member terminals may occur using the forward channels 54, 58 transmitting response messages on the forward discovery channel 54 and data traffic messages on the forward traffic channel 58. For example, FIG. 6 illustrates a control terminal for use with the FDD system illustrated in FIG. 5. The control terminal 60 includes a discovery channel transmitter 62 and a discovery channel receiver 64 for transmission and reception on the discovery channels 52, 54. The control terminal also includes a traffic channel transmitter 66 and a traffic channel receiver 68 for transmission and reception on the traffic channels 56, 58.

Figure 7:
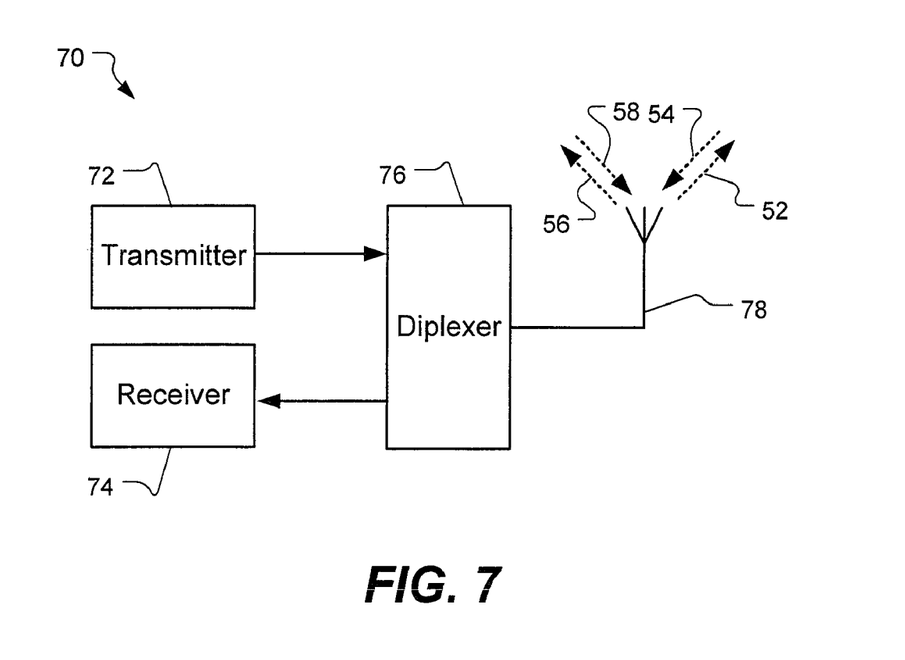
FIG. 7 is a block diagram of a member terminal in accordance with another embodiment of the present invention.

FIG. 7 illustrates an exemplary member terminal for use with the FDD system of FIG. 5. The member terminal includes a transmitter 72, which can be used for transmission of discovery messages or data traffic. The member terminal also includes a receiver 74, which can be used for reception of discovery messages or data traffic. The terminal can include a diplexer 76 which provides isolation between the transmitter and receiver, allowing simultaneous transmission and reception (e.g., transmission on f1 and simultaneous reception on f3 or transmission on f3 and simultaneous reception on f4).

Figure 8:
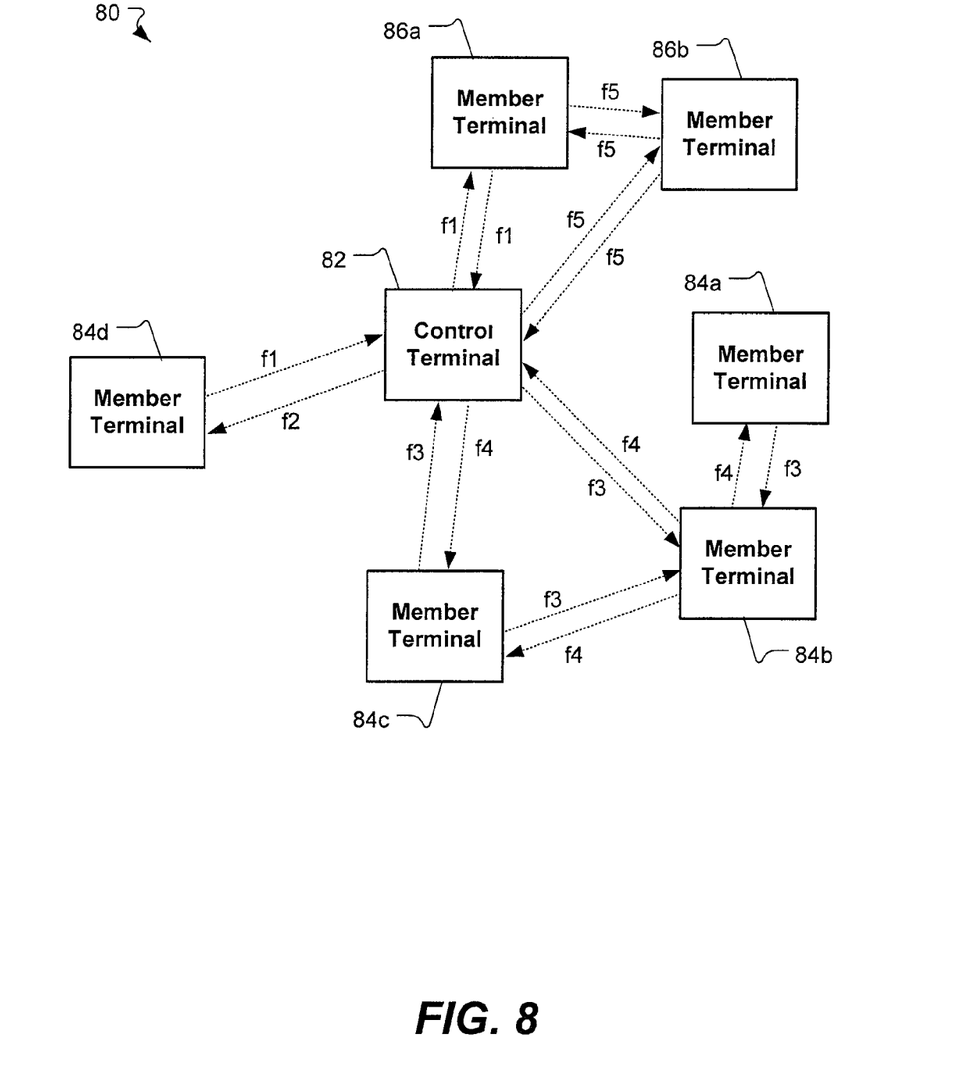
FIG. 8 is a block diagram of a communication system in accordance with another embodiment of the present invention.

The member terminal 70 diplexer 76 may be switchable, if desired, to allow swapping of the transmit and the receive frequencies (e.g., transmission on f4 and simultaneous reception on f3). This can enhance the ability of terminals to communicate with each other directly. For example, as illustrated in FIG. 8, a communications network can include terminals 84*a*, 84*b*, 84*c* which transmit to each other using different combinations of traffic channel frequencies f3 and f4 in a an FDD mode. For example, terminal 84*a* and terminal 84*c* both transmit on f3 and receive on f4, while terminal 84*b* transmits on f4 and receives on f3. Terminal 84*d* can enter into the network in FDD mode by communicating with a control terminal 82 using f1 and f2. As a specific example, terminal 84*d* may be capable of only operating in FDD mode.

The control terminal 82 may also communicate with the terminals 84*a*, 84*b*, 84*c*, 84*d* using f3 and f4. If desired, the control terminal may also include switchable diplexers to allow alternative communication, for example with terminal 84*c* or terminal 84*d*, by interchanging the transmit and receive frequencies.

FIG. 8 is also used to discuss exemplary TDD operation. A TDD-mode terminal 86*a* may enter into the network by transmitting and receiving discovery messages using f1. As a specific example, terminal 86*a* may be capable of only operating in TDD mode. Message exchange between the TDD-mode terminal and the control terminal can occur, because the control terminal is informed by the join request message that the terminal is operating in TDD mode. If desired, the network may include multiple TDD terminals 86*a*, 86*b* which exchange data using either the discovery channel carrier frequency f1, or another frequency (e.g., f3 or f5). More generally, TDD communications may occur using a single carrier frequency (e.g., f1) for all communications; such as, for example, both discovery and data traffic transmissions may occur using the same carrier frequency. In such a case, the diplexer in the control terminal and member terminal can be replaced with an antenna switch. Alternately, TDD communications may use two different frequencies, using one carrier frequency (e.g., f1) for discovery traffic and another, different carrier frequency (e.g., f5) for data traffic. Again, a diplexer may not be needed in such a case.

Figure 9:
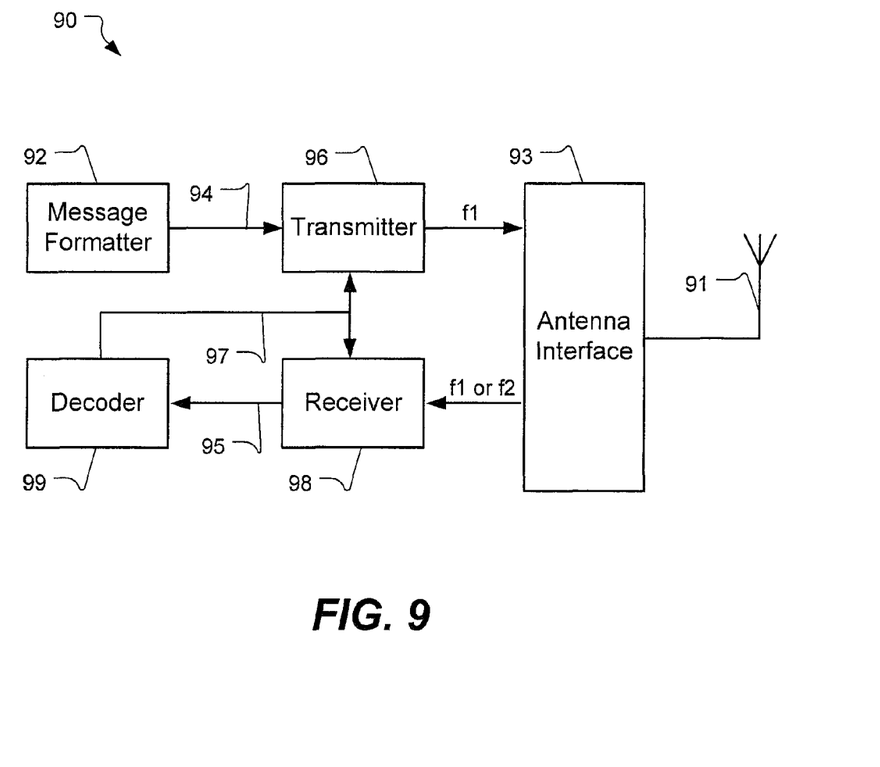
FIG. 9 is a block diagram of a member terminal in accordance with another embodiment of the present invention.

FIG. 9 illustrates a terminal 90, in accordance with another embodiment of the present invention. The terminal includes a message formatter 92 to format join request messages 94. The join request messages may include a duplex capability indicator associated with a defined receive carrier frequency (e.g., f1 or f2). For example, join request messages may be defined according to a discovery protocol as described above. The join request messages are provided to a transmitter that transmits the join request messages on a defined transmit carrier frequency (e.g., f1).

The terminal 90 also includes a receiver 98 configured to receive at the defined receive carrier frequency and output response messages 95. For example, the defined receive carrier frequency may be f1 for a TDD terminal or f2 for an FDD terminal. The response messages are passed to a decoder 99 which extracts communications network parameters 97 from the response messages to enable the terminal to enter into the communication network. For example, the response message may include information defining communications network parameters, such as traffic channel carrier frequency (e.g. 16,500 MHz etc.), traffic channel data rate (e.g. 2 Mb/s etc.), traffic channel duplex mode (e.g. TDD, FDD, etc.), traffic channel modulation mode (e.g. OQPSK, BPSK, etc.), traffic channel synchronization parameter (e.g. frame timing, frame length, layer two protocol, transmission security settings, etc.), and the like as described above.

The transmitter 96 and receiver 98 are coupled to an antenna 91 via an antenna interface 93. The antenna interface may be either a diplexer, a switchable diplexer (e.g., as discussed above), or a switch. For example a switch may be used for TDD operation. For FDD operation, a diplexer may be used. For FDD operation, a switchable diplexer allows operation using interchangeable transmit and receive frequencies.

Figure 10:
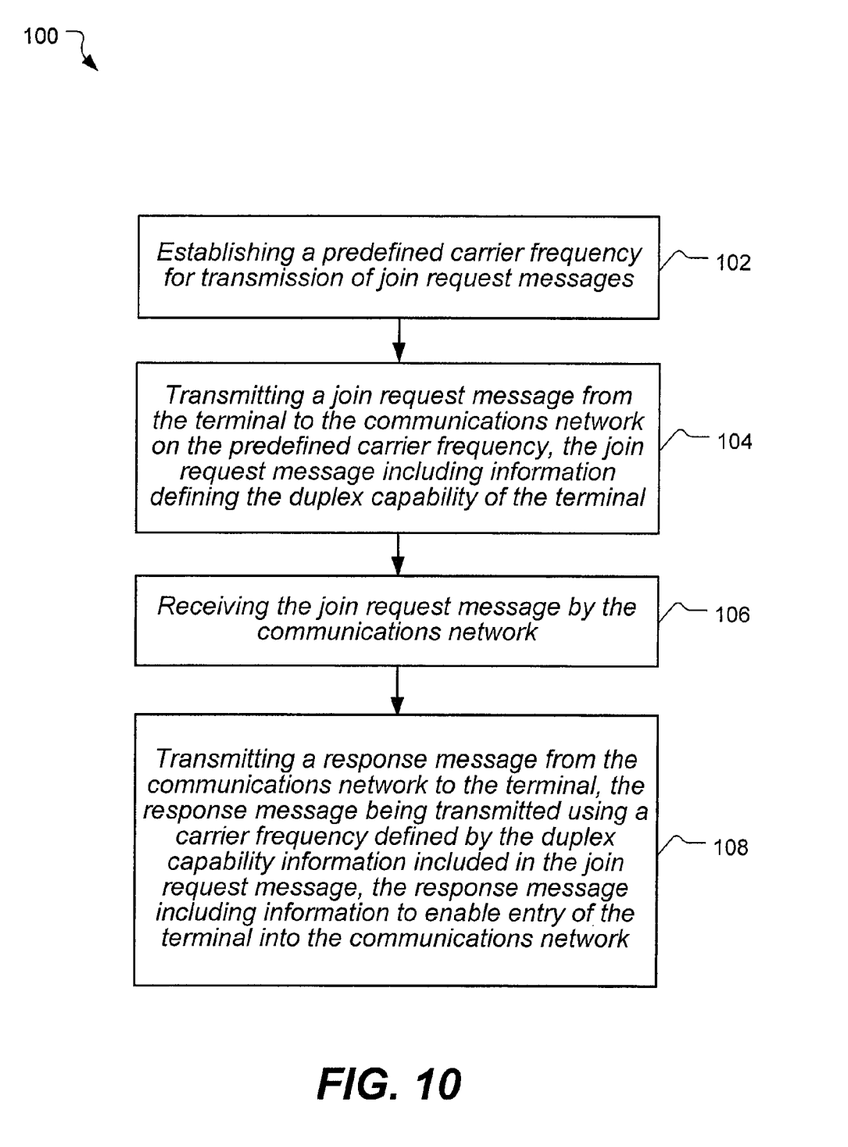
FIG. 10 is a flow chart of a method of facilitating the entry of a terminal into a wireless communications network in accordance with an embodiment of the present invention.

FIG. 10 describes a method of facilitating the entry of a terminal into a wireless communications network. The method 100 can include establishing 102 a defined transmit carrier frequency for transmission of join request messages. For example, a fixed carrier frequency may be defined, such as f1. The fixed carrier frequency information may be preprogrammed into terminals. As another example, the wireless communications network may broadcast a beacon which includes information establishing the defined transmit carrier frequency for transmission of join request messages.

The method 100 can also include transmitting 104 a join request message from the terminal to the communications network on the defined carrier frequency. The join request message includes information defining the duplex capability of the terminal, which allows the communications network to know how to transmit back to the terminal. This information may, for example, be associated with a defined receive carrier frequency. For example, for a FDD terminal, the transmission from the communications network to the FDD terminal can occur on the defined receive carrier frequency, which is different from the defined transmit carrier frequency. As another example, for a TDD terminal, the defined transmit carrier frequency and the defined receive carrier frequency can be the same frequency. As another example, the duplex capability information can be a duplex capability field or a receive carrier frequency field, as described above.

Another step of the method 100 is receiving 106 the join request message by the communications network. The method can also include transmitting 108 a response message from the communications network to the terminal. The response message can be transmitted using the defined receive carrier frequency. The response message can include at least one field defining system information to enable entry of the terminal into the communications network, for example, as described above.

In accordance with another embodiment, the method can also include transmitting a confirmation message from the terminal to the communications network. For example, the confirmation message may indicate acceptance of connection conditions specified by the network information. As another example, the confirmation message may indicate inability to operate using specified network operating parameters defined by the network information, and initiate a negotiation between the terminal and the communications network. For example, the negotiation may include negotiating whether the terminal entering the network will operating in TDD mode or FDD mode, and if operating in FDD mode which frequencies are used for outbound and inbound traffic relative to the terminal.

In accordance with another embodiment, the method can further include entering the terminal into the communications network so that data traffic communications between the terminal and the communications network can occur. For example, join request and response communications may use a first set of communications channels, and data traffic communications may occur using a second set of communications channels. The first set of communications channels may be TDD or FDD, and independently the second set of communications channels may be TDD or FDD.

Summarizing and reiterating to some extent, it will be appreciated that several advantages are provided by the presently disclosed inventive techniques. The foregoing examples are necessarily limited in complexity in the interest of brevity. Alternate arrangements of a communications networks and discovery protocol methods similar to the above examples will occur to one of skill in the art. Benefits of the disclosed techniques include the ability of FDD-capable terminals and TDD-capable terminals to enter a communications system operating in either FDD or TDD mode. An additional benefit is the ability of a network to operate with a mixture of TDD and FDD terminals. Accordingly, discovery can be used to enable FDD-FDD, FDD-TDD, TDD-FDD and TDD-TDD systems to communicate with each other.

It will be understood that references to carrier frequency refer to a nominal frequency at which a radio signal is transmitted. The actual frequency of transmission may vary from the nominal frequency due to such effects as oscillator error, drift, other errors, intentionally-induced offsets, etc. Similarly, the actual frequency at which a transmission is received may also vary, for example, due to Doppler effects. Receive frequencies may also appear to be offset due to oscillator error, drift, or other error sources within the receiver. It will also be understood that transmissions typically occupy a bandwidth, and thus a radio signal contains energy at frequencies other than just the carrier frequency. Furthermore, many modulation formats suppress carrier energy, and thus have no discernible carrier component during transmission. Carrier frequency may be defined differently for directly modulated signals (e.g., QPSK may be defined with a carrier frequency centered within the transmitted power spectrum) than for indirectly modulated signals (e.g. audio-frequency shift keying may have the carrier frequency defined as the frequency of the (suppressed) audio carrier, or may have the carrier frequency defined as the frequency on which the modulation is centered).

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A wireless communications system enabling entry of terminals operable in a frequency-division duplex or a time-division duplex mode, the system comprising:
    at least one control terminal being compatible with frequency-division duplex and time-division duplex operation, having capability for transmission using a first carrier frequency and a second carrier frequency and having capability for reception using at least the first carrier frequency;
    a defined discovery protocol comprising a message format for join request messages and a message format for response messages;

a join request message format comprising a field defining the duplex capability of a joining terminal and transmitted to the control terminal using the first carrier frequency; and a response message format comprising a field defining network information and transmitted from the control terminal using a selected one of either the first carrier frequency or the second carrier frequency, selection being based on the duplex capability information received in a corresponding join request message.

2. The system of claim 1, wherein the at least one control terminal is further capable of reception using the second carrier frequency.

3. The system of claim 2, wherein the at least one control terminal further comprises a switchable diplexer.

4. The system of claim 1, wherein the at least one control terminal further comprises:
a traffic channel receiver for reception of data traffic;
a traffic channel transmitter for transmission of data traffic; and
wherein the traffic channel receiver and transmitter use at least one traffic channel carrier frequency different from the first carrier frequency and different from the second carrier frequency.

5. The system of claim 4, wherein at least one of the response messages comprises a field defining the at least one traffic channel carrier frequency.

6. The system of claim 4, wherein least one of the response messages comprises a field defining a traffic channel mode of operation.

7. The system of claim 1, further comprising:
at least one member terminal, the member terminal capable of transmission on the first carrier frequency and capable of reception on the second carrier frequency; and
wherein the member terminal is in communication with the control terminal.

8. The system of claim 1, further comprising:
at least one member terminal, the member terminal capable of transmission on the first carrier frequency and capable of reception on the first carrier frequency; and
wherein the member terminal is in communication with the control terminal.

9. The system of claim 1, wherein the information defining the duplex capability of the joining terminal comprises a terminal receive carrier frequency field within the join request message.

10. The system of claim 1, wherein the information defining the duplex capability of the joining terminal comprises a terminal duplex mode field within the join request message, and a defined relationship between terminal duplex mode and terminal receive carrier frequency is known by the communications network.

11. A terminal for use within a communications network, the terminal comprising:
a message formatter configured to format a join request message having a duplex capability indicator, the duplex capability indicator being associated with a defined receive carrier frequency;
a transmitter coupled to the message formatting and configured to transmit the join request message using a defined transmit carrier frequency;
a receiver coupled to the transmitter and configured to receive a response message using the defined receive carrier frequency; and
a decoder coupled to the receiver and configured to extract communications network parameters from the response message, the communications network parameters suitable to enable entry of the terminal into the communications network.

12. The terminal of claim 11, wherein the duplex capability indicator comprises a field defining a receive carrier frequency.

13. The terminal of claim 11, wherein the duplex capability indicator comprises a field defining whether the terminal operates in frequency-division or time-division duplex.

14. The terminal of claim 11, wherein the defined receive carrier frequency equals the defined transmit carrier frequency.

15. The terminal of claim 11, wherein the defined receive carrier frequency is different from the defined transmit carrier frequency.

16. The terminal of claim 11, wherein the communications network parameters comprises at least one field within the response message having at least one of the following parameters: a traffic channel carrier frequency, a traffic channel data rate, a traffic channel duplex mode, a traffic channel modulation mode, and a traffic channel synchronization parameter.

* * * * *